(12) United States Patent
Dralle et al.

(10) Patent No.: US 7,660,433 B2
(45) Date of Patent: Feb. 9, 2010

(54) METHOD AND A SYSTEM FOR AUTOMATIC MEASUREMENT AND TRACKING OF LOGS, INDUSTRIAL WOOD AND BOARDS

(75) Inventors: Kim Dralle, Helsingor (DK); Mads Jeppe Tard-Johansen, Kobenhavn (DK)

(73) Assignee: Dralle A/S, Horsholm (DK)

( * ) Notice: Subject to any disclaimer, the term of this patent is extended or adjusted under 35 U.S.C. 154(b) by 686 days.

(21) Appl. No.: 10/525,377

(22) PCT Filed: Aug. 27, 2003

(86) PCT No.: PCT/DK03/00561

§ 371 (c)(1),
(2), (4) Date: Apr. 6, 2005

(87) PCT Pub. No.: WO2004/020938

PCT Pub. Date: Mar. 11, 2004

(65) Prior Publication Data

US 2006/0092403 A1    May 4, 2006

(30) Foreign Application Priority Data

Aug. 27, 2002 (DK) .................................. 200201258

(51) Int. Cl.
*G06K 9/00* (2006.01)
*G01B 11/14* (2006.01)
(52) U.S. Cl. ........................ 382/103; 356/625
(58) Field of Classification Search ................. 382/103; 356/625
See application file for complete search history.

(56) References Cited

U.S. PATENT DOCUMENTS

| | | | |
|---|---|---|---|
| 4,364,732 A * | 12/1982 | Chi et al. ................. | 434/219 |
| 4,392,204 A | 7/1983 | Prim et al. | |
| 4,913,551 A * | 4/1990 | Davis ....................... | 356/627 |
| 5,544,757 A * | 8/1996 | Geiger et al. ............ | 209/518 |
| 5,900,590 A * | 5/1999 | Solberg et al. ............ | 177/1 |
| 6,069,861 A * | 5/2000 | Zhang et al. ............. | 369/112.27 |
| 6,182,725 B1* | 2/2001 | Sorvik ..................... | 144/335 |
| 2002/0024677 A1* | 2/2002 | Metcalfe et al. ......... | 356/625 |

FOREIGN PATENT DOCUMENTS

WO    WO 99/23873    5/1999

* cited by examiner

*Primary Examiner*—John B Strege
(74) *Attorney, Agent, or Firm*—Oliff & Berridge, PLC

(57) ABSTRACT

A method for tracking and measuring volume, shape and surfaces of objects, such as logs, simultaneously. In series of load and unload operations along a procurement line, series of images are captured by e.g., CCD stereo cameras with sufficient spatial resolution capabilities. Simultaneously, the location of objects (logs) are registered by a GPS system aiding the tracking of the objects. The load and unload operations are typically performed by machineries such as harvesters, forwarders or trucks all equipped with a crane. On such machines digital cameras are mounted on jib arms and a computer system is attached. A GPS system is mounted on the machines too and the computer system is attached here as well. Thus the real time processing of stereo images can be accomplished and the volume, shape and surface of the 3D objects are computed simultaneously with their location in space. The resulting data are sent to a central database that keeps track of objects and their locations. These data are then again available for the following step in the procurement line as "a priory" information, facilitating the computation of the size, shape, surface and location of logs (objects) at the current load/unload operation. A chain of information provided by this invention will profoundly increase efficiency of any production chain subjectable to the presented method.

16 Claims, 3 Drawing Sheets

Schematic representation of logs in grab and location of sensor system.

| Operation | Action |
|---|---|
| Forest inventory / marking | Forest resource survey |
| Felling | Felling<br>Delimping and cross-cutting<br>Log dump in terrain |
| Forwarding | Loading from terrain<br>Stacking on forwarder<br>Unloading in stack at forest road |
| Transportation by truck | Loading from stack at forest road<br>Stacking on truck<br>Unloading in stack at plant |
| Wood industry | Load logs to saw or pulp mill<br>Sorting and storing boards |

Figure 1: Conceptual chart of wood procurement process.

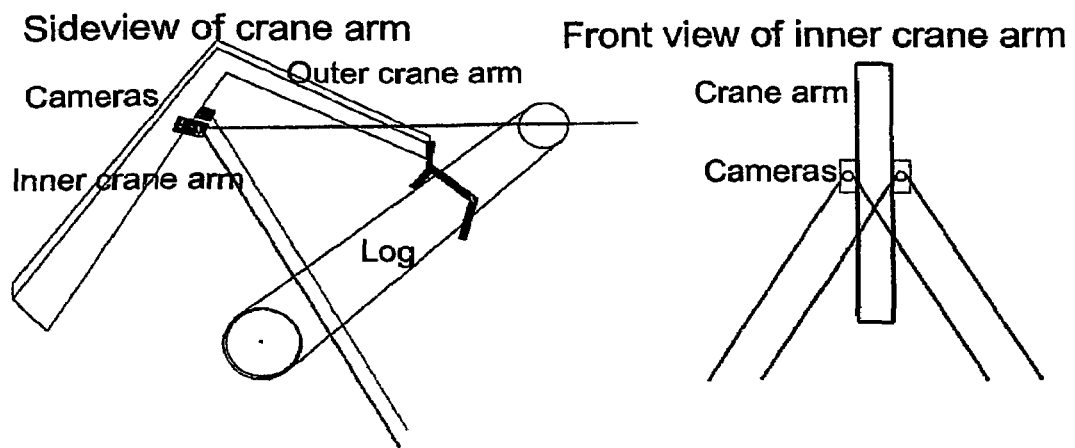
Figure 2: Schematic representation of logs in grab and location of sensor system.
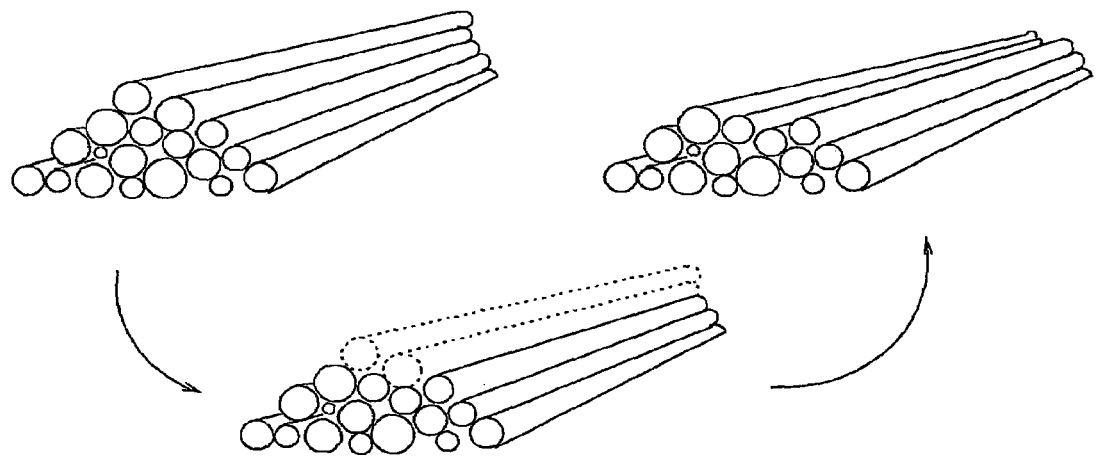
Figure 3: Schematic representation of a stack changing size.

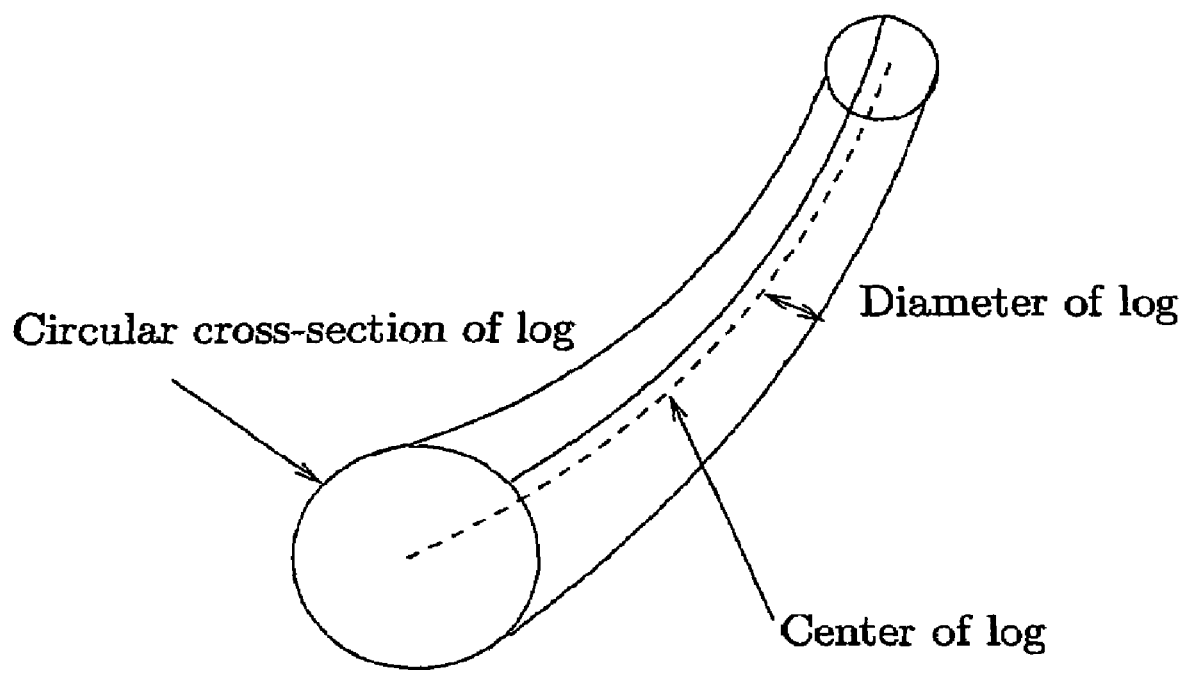
Figure 4: Visualization of parameterization of a log.

METHOD AND A SYSTEM FOR AUTOMATIC MEASUREMENT AND TRACKING OF LOGS, INDUSTRIAL WOOD AND BOARDS

FIELD OF INVENTION

This invention relates to measurement and tracking of objects by use of photogrammetric methods. The invention targets the situation where bundles of such objects are handled for being collected in larger bundles or for further processing of individual objects. During this action the individual objects of a small bundle will be visible to a large extend. In its simplicity the idea then is by photogrammetric methodologies to obtain information of a particular object from imagery of one or more small bundles where it appears. More specifically the three dimensional (3D) extend of an object and properties related to its surface such at texture and other significant characteristics are extracted. Capturing imagery while grabbing and releasing the small bundles and/or at successive points during the handling gives the information necessary to keep track of the transportation path in time and space of each individual object. Thus the methodology in total provides measurements and tracking of the individual objects.

Clearly the invention encompasses a wide range of possible applications. A generic example is an industrial process where a commodity travels through several steps of subprocesses during the manufacturing. The specification here is focused on a unique design for use in the forestry and wood processing industry.

During the last decades forestry has undergone a substantial degree of mechanization. Today wood is harvested and processed at an increasing speed and the wood industries makes up large units. Further the machinery used applies highly developed technologies. As a standard felling machinery and saws at sawmills are equipped with various computer technologies to aid software for optimization in each step of the procurement process. At so the same time there is a growing public awareness of the management of natural resources and the utilization of those resources that are harvested. It is generally agreed that future advances relating to wood processing are to be obtained from further optimizations of the wood procurement process. The present invention facilitates optimizations throughout wood procurement process by providing detailed information of the wood (objects) at any stage where the system is applied.

GENERAL SECTION

The present invention is a real-time computer vision and tracking system to automatically locate and measure the size and quality of individual hard and softwood logs, pieces of industrial wood, and boards, hereinafter logs.

This system is to rationalize, and increase efficiency and measurement accuracy throughout the wood procurement process. Further, the precise tracking of the logs allows for accurate documentation in e.g., pursuit of wood certification.

By a computer vision system is understood a single or a series of computer sensor systems with integrated GPS. The vision system locates and measures the logs at several stages of some wood procurement process. The results of one or more of these measurements are to be used independently or in conjunction to give precise and unbiased estimates of position, size and quality of logs at any specific stage.

By tracking is understood a record of the positions of a recognized log along the procurement process where the system is applied e.g., the positions of a specific log from felling to any stage along the procurement process where the system is no longer applied.

The system will satisfy different immediate demands for information of various actors along the procurement process. In particular: i) buyers and sellers demand for accurately measured and classified trading units and documentation hereof, and ii) the need to back-track logs and other wood commodities to their origin in the forest for certification purposes.

Further, the information collected by the system up to any given stage (operation) of the procurement process can be utilized for optimization purposes in subsequent stages of the procurement process. This increases the efficiency of the procurement process.

A schematic representation of the wood procurement process is shown in FIG. 1. The action pattern of logs being loaded and unloaded by similar devices e.g., cranes, is repeated at all operations throughout the procurement process. Therefore the system is designed to apply similar computer sensor systems and similar image analysis algorithms at all stages.

Typically logs are traded at one or more of the operations listed in FIG. 1. Thus the unit for trade is a varying collection of logs and the system is designed to compute aggregate values for such collections of logs.

The system can be applied at any action or set of actions e.g., an operation listed in FIG. 1. In consequence it is the responsibility of buyers and sellers to decide on what stages it is appropriate to apply the system. Back-tracking boards to their origin in the forest does naturally require the system being applied at most unload and load points (actions).

The present invention suggests measuring individual logs using a stereo vision system integrated with GPS. The GPS system provides the location in space of the equipment that handles the logs and the vision system. Combined with automatic recognition of the logs in imagery captured by the vision system the path of each individual log can be mapped to provide tracking of the logs.

The core idea of the vision system is that it captures imagery of the logs during load/unload actions. During these actions only a few logs are handled at a time by a crane or similar device. Imagery of a bundle of few logs allows for a complete recognition of each individual log in the bundle. Candidate mount points of vision system are e.g., grab on harvester or forwarder, body of harvester or forwarder, truck at plant, conveyer belt or any other place where the logs can be seen from vision system.

Further, imagery of the stacks (collections of logs) that are being loaded or unloaded are captured continuously to monitor exactly where each bundle of logs are placed or taken from. In this way stacks are considered cohorts of individual logs with their individual properties such as transportation path and size. Thus aggregate quantities and distributional statistics at the stack level can be computed to characterize a stack.

The idea of measuring logs on the fly by remote sensing and stacks being cohorts of logs with an associated record of information at the log level is an advance compared to todays practices. Common practices is to measure stacks in a separate process and characterize stacks by their outer measure and other aggregate quantities.

Each individual log is being monitored several times during the procurement line. At any load/unload action stereo imagery of each log while located in the unload stack, the crane and the load stack is being captured. This comprehensive information source forms the basis of an image analysis algorithm to estimate the size and location of the logs with a high level of accuracy. Integrating imagery across several operations in FIG. 1 in the image analysis adds to the level of accuracy that can be obtained.

The image analysis algorithm is designed to adopt information from many sources. Hence the algorithm allows data fusion from sources such as field inventory, harvester, regional prior information on size and quality, and information dynamically gathered during a forest operation to ensure self-calibration.

An important by-product of the real-time implementation of the system is that the influence of decay and other biological factors can be quantified. Especially if there is a time-lag between the creation of a stark and it being picked up, using the system at both of these operations makes it possible to monitor changes in the stack.

The present invention is considered applicable for other industrial uses where 3D objects are being handled in a similar repeated load/unload fashion in stacks.

BRIEF DESCRIPTION OF THE DRAWINGS

Various exemplary embodiments of the disclosed systems and methods for automatic measurement and tracking of logs, industrial wood and boards are described, in detail, with reference to the following drawings wherein:

FIG. 1 illustrates an exemplary conceptual chart of a wood procurement process from the systems and methods according to this disclosure;

FIG. 2 illustrates an exemplary embodiment of logs in grab and a location of a sensor system according to this disclosure;

FIG. 3 illustrates an exemplary embodiment of a stack of logs changing size according to this disclosure; and FIG. 4 illustrates an exemplary embodiment of a visualization of a parameterization of a log according to this disclosure.

SPECIFIC SECTION

The system is designed to be build from standard components that complies with industry standards to ensure portability and low cost. In particular standard cameras, standard image formats, standard graphics hard and software, standard computer units with accompanying operating systems suffice to build an operational system.

One example of an actual implementation of the this system is based on CCD digital cameras with a spatial resolution of 2-5 mm$^2$ per pixel for objects located at 2-15 m distance in physical space from the vision system. The image format is compressed tiff and the software implementation of this system written in C/C++/C# runs a windows or Linux box. The graphics procedures runs through an accelerated 3D graphics card using the OpenGL language.

In the following is by machinery understood some machinery that handles logs along the wood procurement process. The device used by such machinery to handle the logs will be referred to as a grab.

Some examples of machinery are Valmet and Ponsse harvesters and forwarders, Mack and Volvo trucks with trailers build to load logs and equipped with jibs, and genuine cranes at the saw or paper mills.

The stereo vision system is to be mounted on the machinery such that a continuous series of images of the logs that are being handled can be captured. The ideal strategy is to capture one or more set of images of the load and unload stacks and of the bundle of logs in the grab for each bundle of logs being handled.

As an example harvesters have lights mounted pairwise on their jibs arms and shielded by a frame. A set of cameras are conveniently mounted next to the lights within these frames. When the operator fells a tree and at each time a log is cut off the vision system takes images. For a forwarder the cameras are mounted similarly, but here the images are taken whenever a new cohort of logs i grabbed or released and at regular time intervals in-between or whenever the orientation of the cohort in the grab is optimal relative to the cameras.

The GPS unit is mounted on the machinery too. From its continuous logging of signals the absolute orientation and location in space of the machinery is known. Given the orientation of the grab relative to the machinery the location in space of the grab is computed.

Logs are three-dimensional (3D) solid objects. In consequence the image analysis algorithms are implemented by use of software routines supported by standard 3D graphics hardware. Computing images of a virtual 3D universe that represents the real world stacks and bundles of 3D logs then is fast and straight forward.

The resulting information about stacks or bundle of logs computed from the images are subsequently stored in a central database. This information include basicly estimates on size, location and quality of the individual logs. Further, aggregate values at stack level as well as image scenes (movie pictures) of part of or of the whole recorded operation should be stored in the database too.

The central database can be located on any pre-selected machinery or office computer. The only requirement is that the other computers are able to access the central computer by an online connection e.g., the Internet by a phone card or a similar standard device. This way the system is robust against hardware failure on any link in the procurement line.

The image analysis algorithm for tracking and size estimation is conceptually split into two stages. Stage 1 is a coarse recognition of the logs taken from or added to a stack, and the logs held in the grab. Stage 1 is accomplished by template matching or other filtering and provides approximate location and size of logs in the virtual 3D world. Stage 2 is to infer accurately about each individual log from the image data available and other prior information. The approximate configuration of the virtual 3D world from Stage 1 is used as initial value for stage 2. Stage 2 is more involved and applies a formal statistical analysis. The outcome of the Stage 2 axe configurations of the virtual 3D world (one for each captured image used in the analysis) that describes the real world best given the information available. In other words, Stage 2 provides the transportation paths of the logs and their size and quality.

Both of Stage 1 and Stage 2 require a specification of the virtual 3D world that mimics the real world. That is, a mathematical model is set up to describe the 3D shape of the logs and their transportation path. This model is then adjusted (estimated) to fit best possible with the actual taken images.

A possible mathematical model for a log is that the stem center follows a 2nd, 3rd or 4th order polynomial (in a plane) and that cross-sections perpendicular to the stem center are circular with diameter a linear function of distance to the stem base (FIG. 4). Alternatively diameter can be specified by stem taper functions commonly described in literature.

Given a specification of the virtual world the mapping into image space (image formation) is required to compute the images of the virtual world. It is by comparison of these computed images and the actual taken images that the mathematical model can be estimated.

As an example if the vision system is based on CCD cameras the mapping from object space (the physical world) into image space is the composition of a central projection and the deterioration by the lens and irregularities induced by the chip. The two latter together makes up the so-called inner orientation and is a specific property of each camera. The inner orientation is established separately from a test scene in a laboratory. The location and attitude of the cameras in the vision system relative to one-another together with the model for image formation makes up a stereo vision system. That is, a system that allows for 3D reconstruction of the objects of interest (the logs).

The Stage 1 filter that singles out individual logs in the grab operates on a complex source of information including one or more of: grab "width", location of grab in space (implicitly orientation of logs), exact record of the logs handled if taken from stack already monitored by the system, other prior information on log size e.g., from harvester.

The Stage 1 filter that singles out individual logs taken or added to a stack operates on successive images of the stack to detect changes in its surface. Candidate locations of logs are identified from these changes (FIG. 3). Information about the location of the grab where it took or added logs and the bundle that was handled is used in support of this filter.

In essence the Stage 1 filters map the complete transportation path of each individual log and the tracking is completed. Note that image data and GPS data are used in conjunction to complete this task.

The inference framework for Stage 2 is Bayesian where the likelihood term $f(I;\theta)$ is the density of the image data I under a statistical model parameterized by $\theta$ and $\pi(\theta)$ is the prior on $\theta$. The statistical model encompasses the model of the virtual 3D universe, the image formation process and the randomness of noise in the imagery. The posterior p is given by $p(\theta;I) \propto \pi(\theta) f(I;\theta)$. Since $\theta$ includes the parameterization of the virtual 3D world, maximizing p provides an estimate of the configuration of the 3D real-world logs. A natural choice of the prior $\pi$ is knowledge about the size distribution of the logs under study. Typically this information is easily obtained from growth models or yield tables.

Technically each log in the virtual world is represented by a discrete spatial object during the maximization of the posterior. The set of points that spans the log are derived from the underlying mathematical model. The triangulation between these points then makes up the surface of the log. Let $\theta'$ be the parameter that parameterizes a particular log. Then $\theta'$ is a subset of $\theta$. Having maximized p with respect to $\theta$ therefore provides the best value for $\theta'$. Volume and curvature and other important properties of the log are therefore best computed from the value of $\theta'$.

Since logs axe solid objects with a certain regularity in shape, the parameter $\theta'$ can not be considered a completely free parameter. Thus the posterior p is maximized under suitable smoothness constraints on the shape of logs. Further different logs are in principle not allowed to occupy the same physical space. In practice this constraint is relaxed a bit to accommodate for the fact that $\theta'$ is not a perfect representation of the real-world logs.

If the system is applied at several stages along the wood procurement line, the image data I is the aggregate image data from all the consecutive images captured. This implies that the 3D configuration of each log is estimated from image data captured from different directions relative to the log minimizing the occluded volume of the logs.

The system operates in absolute units in the sense that it produces the measured sizes in meters or some other absolute unit. Technically this requires the scale be known in the imagery captured by the stereo vision system. In recognition of the fact that the system operates in a disturbed environment, marks on the grab or other parts of the machinery is used in addition to a known base line of the vision system to obtain scale.

The Stage 2 image analysis gives a coarse assessment of wood quality e.g., based on curvature of a log and the appearance of growth rings at cross sectional cuts of logs. Additional image analysis routines are applied to measure rot percent, knots, bark texture changes to get as much information about wood quality as possible.

When a static of logs is completed the system computes aggregate quantities for the stack. The set of quantities computed may be changed dynamically by the user. Typical aggregate quantities are: number of logs in the stack, total volume of the logs in the stack, and size and quality distribution of the logs in the stack.

Whenever logs are collected on some machinery and transported to some other location for unload the real-time requirement on the image analysis algorithms can be relaxed. It is not until the unload action takes place that the system must provide the image analysis results. This fact is particularly useful in the first stage where the system is applied is on a forwarder in the forest. At the first stage no prior information about the log is available and successful log recognition and size estimation may require an extended computation time. Usage of the system at subsequent stages along the procurement process will require less computer run time because detailed prior information about the logs are available.

The vision system is mounted on the machinery so that it can capture images of both the grab and the load and unload sta. The ideal situation is that the system be mounted such that for each bundle of logs that is being handled images of both grab and stacks can be captured. Some candidate mount points are jib arm or the body of the machinery as shown in FIG. 2.

A unique feature of the system is that the measuring device, i.e. the vision system, is not in contact with the logs. This implies that the system is less prone to deterioration, and thus the demand for continuous calibration of the system while being applied is low. This is an advantage to measuring devices that are mounted in the felling device of a harvester.

The present invention suggests both the tracking and the size estimation tasks solved by the system. As time progresses and e.g. bio-informatics technologies evolve, the tracking task may be completed from the DNA footprint of each log or some other recognition procedure. By virtue the system is designed to incorporate such information in the Stage 2 image analysis. In other words, the system is designed to be complemented by other information sources that aid the tracking and size estimation.

The most critical factors to the system are the sensor conditions and the number of logs that the grab handles. Operating the system during e.g., night time with a sensor sensible to visible light thus requires the logs being lighted by some artificial light source. If a particular log is occluded by other logs when located in the stack or in the grab, the system can only provide an approximate estimate of its size. The solution space for the volume occupied by that particular log is however quite small so that the overall performance of the system i not adversely effected.

If the order of logs in a stack is modified by some outside factor or its geometric constitution has changed much, the change is recognized by the system and it starts monitoring if logs are missing in the stack.

The invention claimed is:

1. A method comprising the steps of
    taking, at a first location, at least one image of an object enabling identifying the object and recording the at least one image taken of the object and the first location of the object on a storage medium, transporting the object from the first location to a second location, taking, at the second location, at least one image of the object enabling identifying the object, using a computer for determining, at the second location, using the at least one image taken at the first location and the at least one image taken at the second location, the first location of the object, and outputting information on the determined first location of the object, wherein the object is a log.

2. A method according to claim 1, wherein the first location is a location of harvesting the log.

3. A method according to claim 1, wherein at least one of the at least one image taken at the first location and the at least one image taken at the second location allows determining characteristic data about the log.

4. A method according to claim 3, wherein the characteristic data include a volume of the log.

5. A method according to claim 3, wherein the characteristic data include a size of the log.

6. A method according to claim 3, wherein the characteristic data include a quality of the log.

7. A method according to claim 3, wherein the characteristic data include a species of the log.

8. A method according to claim 3, wherein the characteristic data include curvature of the log.

9. A method according to claim 3, wherein the characteristic data includes taper of the log.

10. A method according to claim 3 including, at the second location, unloading a plurality of logs from a forwarder.

11. A method according to claim 3 including, at the second location, reloading a plurality of logs onto a forwarder.

12. A method according to claim 3 including, at the second location, processing the log in a sawmill.

13. A method according to claim 3, wherein the first location of each individual object is determined using a satellite based global positioning system.

14. A method according to claim 1, wherein the at least one first and second images each include a pair of stereo images taken by a pair of cameras.

15. A method according to claim 14, wherein the pair of cameras is mounted on an equipment handling a log.

16. A system for tracking an object being transported from a first location to a second location, the system comprising:

a means for taking, at a first location, at least one image of a object enabling identifying the object and recording the at least one image taken of the object and the first location of the object on a storage medium, a means for transporting the object from the first location to a second location, a means for taking, at the second location, at least one image of the object enabling identifying the object, and a computer for determining, at the second location, using the at least one image taken at the first location and the at least one image taken at the second location, the first location of the object, and a means for outputting information on the determined first location of the object, wherein the object is a log.

* * * * *

UNITED STATES PATENT AND TRADEMARK OFFICE
CERTIFICATE OF CORRECTION

| | | |
|---|---|---|
| PATENT NO. | : 7,660,433 B2 | Page 1 of 1 |
| APPLICATION NO. | : 10/525377 | |
| DATED | : February 9, 2010 | |
| INVENTOR(S) | : Kim Dralle et al. | |

It is certified that error appears in the above-identified patent and that said Letters Patent is hereby corrected as shown below:

On the Title Page

Item (75) should read as follows:

Inventors:   Kim Dralle, Helsinger (DK) Mads Jeppe ~~Tard-Johansen~~Tarp-Johansen, Kobenhavn (DK)

Signed and Sealed this
Eighth Day of February, 2011

David J. Kappos
*Director of the United States Patent and Trademark Office*